(12) United States Patent
Wu

(10) Patent No.: US 9,614,414 B2
(45) Date of Patent: Apr. 4, 2017

(54) DRIVING DEVICE AND AN ELECTRIC MOTORCYCLE DRIVING SYSTEM USING THE DRIVING DEVICE

(71) Applicant: NATIONAL UNITED UNIVERSITY, Miaoli (TW)

(72) Inventor: Yu-Chi Wu, Miaoli (TW)

(73) Assignee: National United University, Miaoli (TW)

( * ) Notice: Subject to any disclaimer, the term of this patent is extended or adjusted under 35 U.S.C. 154(b) by 698 days.

(21) Appl. No.: 14/048,258

(22) Filed: Oct. 8, 2013

(65) Prior Publication Data
US 2014/0296008 A1    Oct. 2, 2014

(30) Foreign Application Priority Data
Mar. 29, 2013    (TW) .............................. 102205841 U

(51) Int. Cl.
*H02K 7/14* (2006.01)
*F16H 47/06* (2006.01)
*F16H 9/18* (2006.01)
*F16H 55/56* (2006.01)

(52) U.S. Cl.
CPC ............. *H02K 7/14* (2013.01); *F16H 9/18* (2013.01); *F16H 55/563* (2013.01); *B62K 2204/00* (2013.01)

(58) Field of Classification Search
CPC .......... H02K 1/2786; H02K 7/14; F16H 9/18; F16H 47/065; F16H 55/563; B62K 2204/00

USPC .............................. 310/67 R, 156.12; 474/69
IPC ........................... H02K 1/27,7/14; F16H 47/06
See application file for complete search history.

(56) References Cited

U.S. PATENT DOCUMENTS

| | | | | |
|---|---|---|---|---|
| 4,097,754 A | * | 6/1978 | Farr ..................... | H02K 21/222 310/168 |
| 5,914,551 A | * | 6/1999 | Kern .................... | H02K 5/1735 310/91 |
| 2004/0232788 A1 | * | 11/2004 | Marioni ................. | D06F 37/30 310/90 |
| 2007/0210656 A1 | * | 9/2007 | Lafontaine .............. | H02K 3/50 310/58 |
| 2014/0296008 A1 | * | 10/2014 | Wu ......................... | F16H 9/18 474/69 |

* cited by examiner

*Primary Examiner* — John K Kim
(74) *Attorney, Agent, or Firm* — Jackson IPG PLLC; Demian K. Jackson

(57) ABSTRACT

The present invention provides a driving device and an electric motorcycle driving system using the driving device. Said driving device comprises a shaft, a pulley disk assembly configured on the shaft, and a motor. The motor is an outer rotor or inner rotor motor. One pulley disk of the pulley disk assembly is connected to one end of the outer rotor sleeve or the inner rotor of the motor, so it can be driven by the outer rotor sleeve or the inner rotor and rotate or move around the shaft; furthermore, an electric motorcycle driving system can use the driving device to connect with a battery and a stepless speed change mechanism, so as to use the electric power of the battery to operate the stepless speed change mechanism, and to consequently enhance the performance of speed and torque output of the electric motorcycles.

4 Claims, 5 Drawing Sheets

DRIVING DEVICE AND AN ELECTRIC MOTORCYCLE DRIVING SYSTEM USING THE DRIVING DEVICE

BACKGROUND OF INVENTION

1. Field of the Invention

The present invention relates generally to an electric motorcycle, and more particularly to a driving device and an electric motorcycle driving system using the driving device.

2. Description of Related Art

To meet the demands of environment protection and energy saving, electric motorcycles are becoming more and more popular than the traditional gasoline motorcycles. The energy used by electric motorcycles is electric power, which features no waste gas discharge and no noise pollution comparing to the engine-driven gasoline motorcycles. However, the speed of electric motorcycles will be limited by the rotational speed and power of the motor itself. Because the motor outputs a low torque under a low speed, and a high torque under a high speed, it is unable to meet the requirement for low speed and high torque. Under a high speed, the motor consumes considerable electric power. Also, as it has no speed change function, the performance of electric motorcycles still falls behind the gasoline motorcycles using the continuously variable transmission (CVT). Secondly, as the electric motorcycles have limited inner space to house the motor and battery, there is limitation for motor installation position and driving mode, which further affects the performance of electric motorcycles.

In recent years, there are some kinds of electric motorcycles provided with continuously variable transmission (CVT) or automatic speed change systems to enhance the performance. Although the electric motorcycles with continuously variable transmission (CVT) or automatic speed change systems offer better performance than the traditional electric motorcycles, they have bigger sizes and their rotational speed is still limited by the power design of the motor.

SUMMARY OF THE INVENTION

The primary objective of the present invention is to provide a driving device and an electric motorcycle driving system using the driving device. By combining a motor and a pulley disk assembly, it considerably reduces the size and enhance the flexibility to use the inner space of the electric motorcycle, and it only uses the centrifugal force generated by the rotation of the motor to toss out the pulley roller to change the overlapping area between the permanent magnet and stator coil inside the motor and change the rotational speed of the motor.

Therefore, to achieve the afore-mentioned objective, the present invention provides a driving device, which comprises: a motor and components of an outer rotor sleeve and a stator coil provided inside the outer rotor sleeve. The inner wall of the outer rotor sleeve is provided with a plurality of permanent magnets; a pulley disk assembly, including a pulley disk, a plurality of pulley rollers on one substrate of the pulley disk and inside the pulley disk. The pulley disk is connected to one end of the outer rotor sleeve and is movable relative to the substrate. The substrate is located inside the outer rotor sleeve; a shaft, connected to the substrate and going through the outer rotor sleeve and the pulley disk. The outer rotor sleeve and the pulley disk can rotate and move relative to the shaft.

In addition, the present invention further provides an electric motorcycle driving system using the driving device, which comprises a battery; a stepless speed change mechanism comprising a fan blade disc, an open-close disc, a clutch, and a belt connecting between the fan blade disc and the open-close disc. The open-close disc and clutch is connected with the wheel of the electric motorcycle; The driving device is connected with the battery and the stepless speed change mechanism, so as to use the electric power of the battery to operate the stepless speed change mechanism. The motor is electrically connected with the battery. The fan blade disc is configured on one side of the pulley disk. One end of the belt is wound between the fan blade disc and the pulley disk.

Furthermore, the present invention provides a driving device, which comprises a shaft; a pulley disk assembly, configured on the shaft in a rotatable manner, comprising a relative pulley disk, a substrate and a plurality of pulley rollers between the pulley disk and the substrate. The pulley disk can move along the shaft; a motor, comprising an inner rotor and such components as a stator coil configured on the periphery of the inner rotor. The inner rotor is connected to the pulley disk, and its periphery is configured with a plurality of permanent magnets corresponding to the stator coil.

BRIEF DESCRIPTION OF THE DRAWINGS

Multiple preferred embodiments are provided below to describe the present invention in more detail with the accompanied drawings.

DETAILED DESCRIPTION OF THE INVENTION

Figure 1:
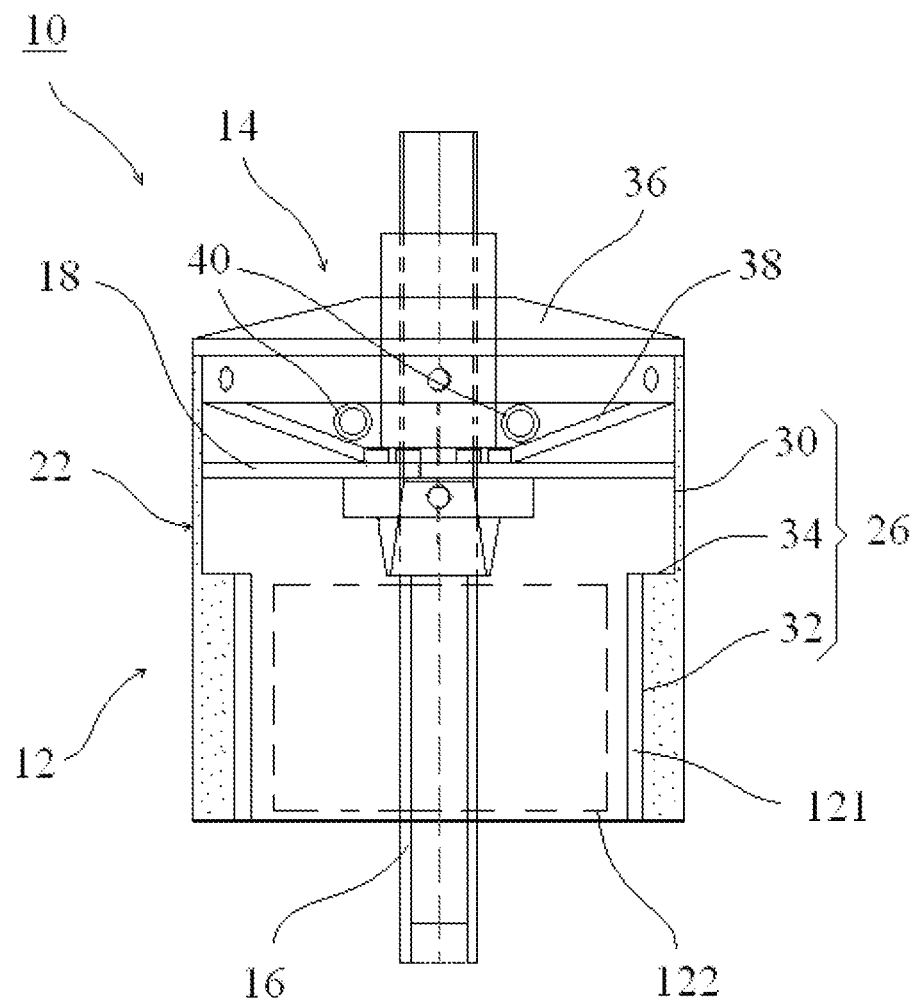
FIG. 1 is a partial sectional view of a preferred embodiment of the present invention.

Firstly, referring to FIG. 1, the driving device 10 of a preferred embodiment of the present invention comprises a motor 12, a pulley disk assembly 14 and a shaft 16.

The motor 12, which is a permanent-magnet brushless outer rotor motor, comprises an outer rotor sleeve 22 and such stator-related components (e.g. silicon steel sheet) like coils configured inside the outer rotor sleeve 22. The outer rotor sleeve 22 comprises a cylinder 26 with two open ends. The inner wall of the cylinder 26 is configured with a first section 30 and second section 32 with different inner diameters. The joining part between the first section and second section is formed as a stage 34. The inner diameter of the first section is larger than that of the second section 32. Furthermore, the inner wall of the second section 32 is provided with a plurality of permanent magnets 121, which are configured on the inner wall of the second section 32 in an N-S-N-S arrangement adopting the 12-groove 14-pole electric motor design. The composition of the permanent magnets 121 and stator coils 122 on the inner wall of the outer rotor sleeve 22 are similar to brushless outer rotor motor, and are not detailed here.

The pulley disk assembly 14 is a pulley disk assembly of continuously variable transmission (CVT), comprising a pulley disk 36 covering a substrate 38 of the pulley disk 36 and a plurality of pulley rollers 40 configured inside the pulley disk 36. The pulley disk 36 is connected to one end of the outer rotor sleeve 22 and is movable relative to the substrate 38. The substrate 38 is located on the inner side of the outer rotor sleeve 22.

The shaft 16 is connected to the substrate 38 and goes through the outer rotor sleeve 22 and the pulley disk 36. The related components like stator coil 122 of the motor 12 are configured on the shaft 16. The outer rotor sleeve 22 and pulley disk 36 can rotate and move relative to the shaft 16.

In addition, the driving device 10 further comprises a contacting plate 18, which is fixed on the shaft 16 and located inside the outer rotor sleeve 22, and is spaced with the stage 34 with some distance corresponding to the substrate 38, so as to prevent the components inside the motor 12 like stator coil 122 from being frictioned and damaged by the substrate 38 during the rotation of the pulley disk assembly 14.

Figure 2:
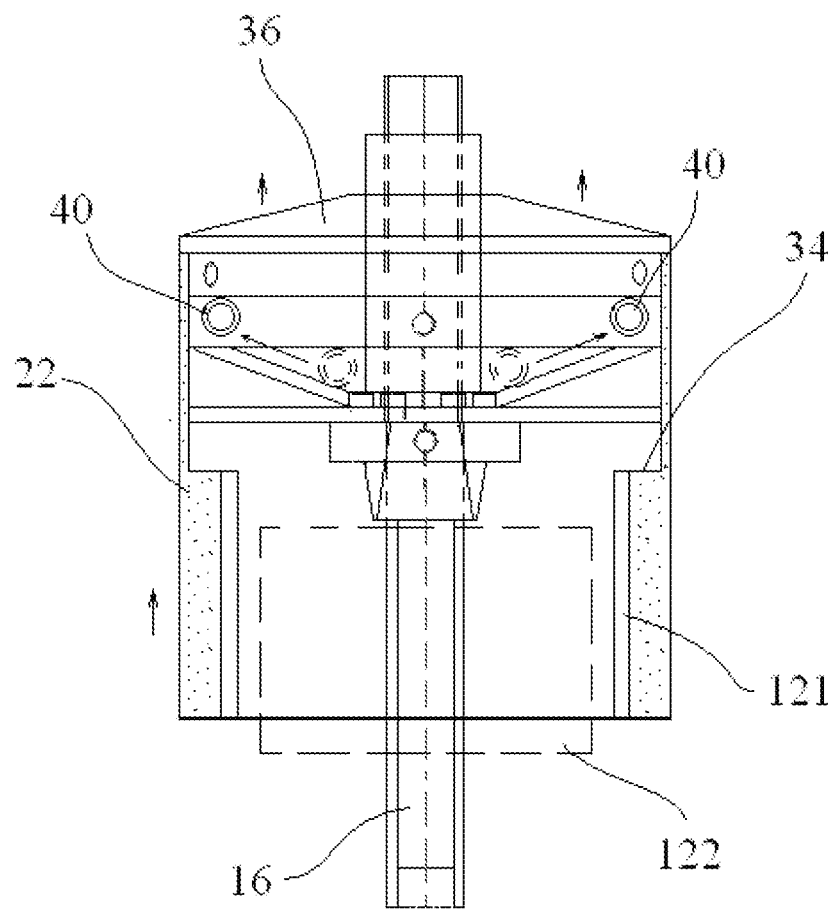
FIG. 2 is an operational view of a preferred embodiment of the present invention, showing the displacement of the pulley disk, and tossing-out of the pulley rollers.

Based on the above, the driving device 10 of the present invention has the following operational mode and characteristics:

When the motor 12 is operating, the outer rotor sleeve 22 can rotate and drive the pulley disk 36 to rotate simultaneously. Each pulley roller 40 will be tossed out under the centrifugal force generated by the revolving pulley disk 36. Higher rotational speed of the outer rotor sleeve 22 will cause a higher centrifugal force from the pulley disk 36 to toss out the pulley rollers 40, consequently pushing the pulley disk 36 to move outward relative to the substrate 38. In this way, the outer rotor sleeve 22 will also be caused to move (the distance between the stage 34 and the contacting plate 18 is for the displacement), as shown in FIG. 2, so that the relative positions of the outer rotor sleeve 22 and related components like stator coil 122 will be changed (changing the overlapping area between the permanent magnets 121 and stator coil 122 inside the outer rotor sleeve 22), and consequently, the rotational speed of the outer rotor sleeve 22 will be changed.

From the above, it is known that, during operation of the driving device, the centrifugal force generated by the revolving pulley disk can toss out the pulley rollers inside it, and the tossed-out pulley rollers with appropriate weights can push the pulley disk to cause a displacement of the outer rotor sleeve, and change the overlapping area between the permanent magnets and stator coil inside the outer rotor sleeve, and consequently change the rotational speed of the outer rotor sleeve. In another word, the driving device can use a mechanical operation to change the rotational speed of the motor.

Figure 3:
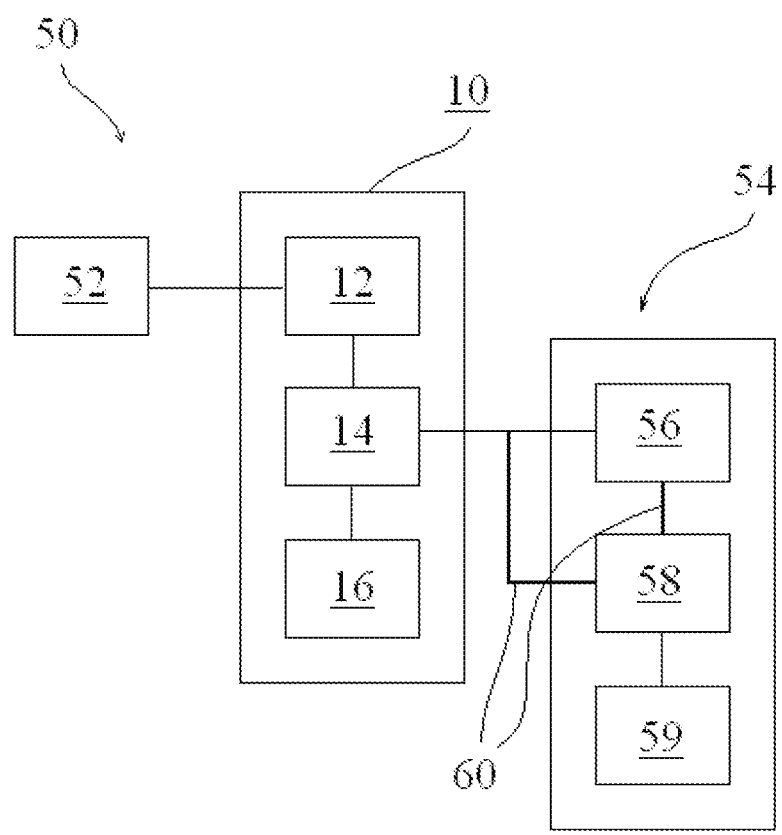
FIG. 3 is a diagram of an electric motorcycle driving system of another preferred embodiment of the present invention.

In addition, the driving device 10 can be applied in the driving system of electric motorcycles. Referring to FIG. 3, which depicts the driving system 50 of electric motorcycles of a preferred embodiment of the present invention, the system comprises a driving device 10, and further comprises a battery 52 and a stepless speed change mechanism 54. The battery 52 is electrically connected to the motor 12. The stepless speed change mechanism 54 is the continuously variable transmission (CVT) of conventional motorcycles, and comprises a fan blade disc 56, an open-close disc 58, a clutch 59 and a belt 60 connecting between the fan blade disc 56 and the open-close disc 58. Its composition is not detailed here. The fan blade disc 56 is configured on one side of the pulley disk 36. The open-close disc 58 and clutch 59 are connected to the wheel of the electric motorcycle. One end of the belt 60 is wound between the fan blade disc 56 and the pulley disk 36.

In this way, the battery 52 can supply the electric power to run the motor 12. When the motor 12 is operating, the stepless speed change mechanism 54 can drive the electric motorcycle to run. As the stepless speed change mechanism 54 is a mechanical automatic speed change system, it will automatically and mechanically adjust the rotational speed and torque of the load to obtain the effect of gear differential and enhance the rotational speed and torque.

In detail, during a low speed, as the pulley disk 36 has no displacement, the perimeter of the front end of the belt 60 is small and that of the back end is large. In this circumstance, the motor 12 can drive the belt 60 to output a high torque, with no worry of insufficient torque. On the other hand, when the speed of the motor 12 is raised, the pulley rollers 40 inside the pulley disk 36 will be tossed out under the centrifugal force, causing a displacement of the pulley disk 36, the belt 60 will have a front end with larger perimeter and back end with smaller perimeter. The perimeter difference between the front end and back end of the belt 60 will generate a higher speed output.

Based on this, the electric motorcycle driving system 50 does not have to consider a balance point between the torque and rotational speed of the motor 12, and only needs to find ways to enhance the rotational speed of the motor 12, while the torque can be enhanced through the driving device 10 and the stepless speed change mechanism 54.

Figure 4:
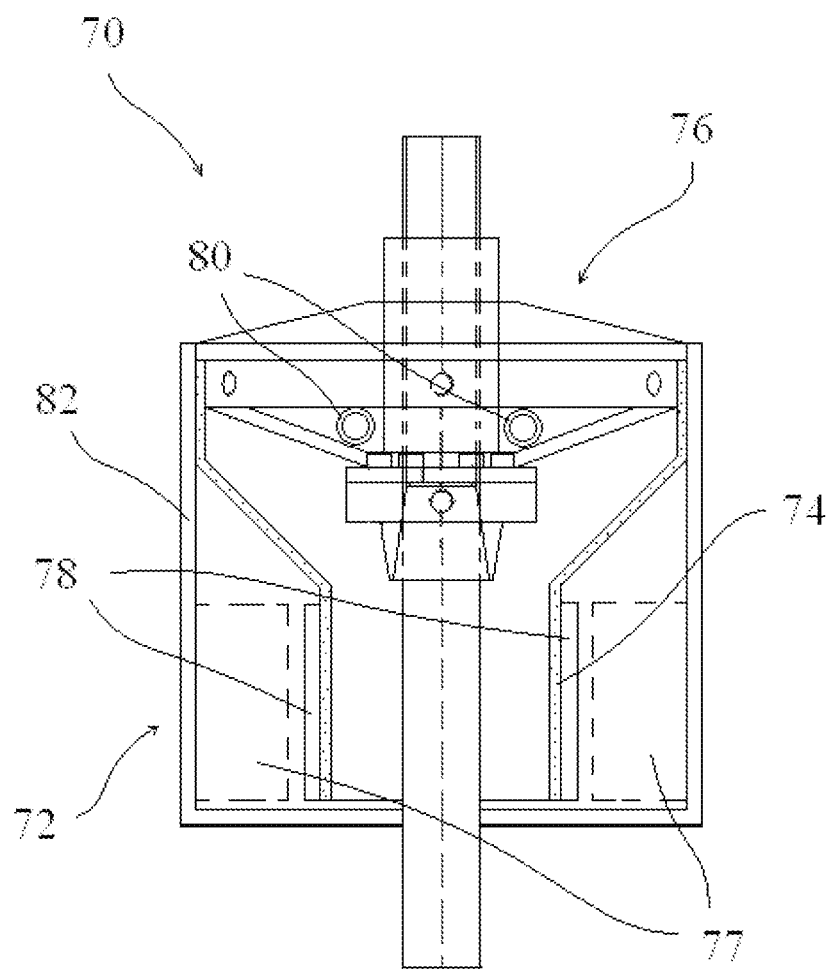
FIG. 4 is a partial sectional view of another preferred embodiment of the present invention.
Figure 5:
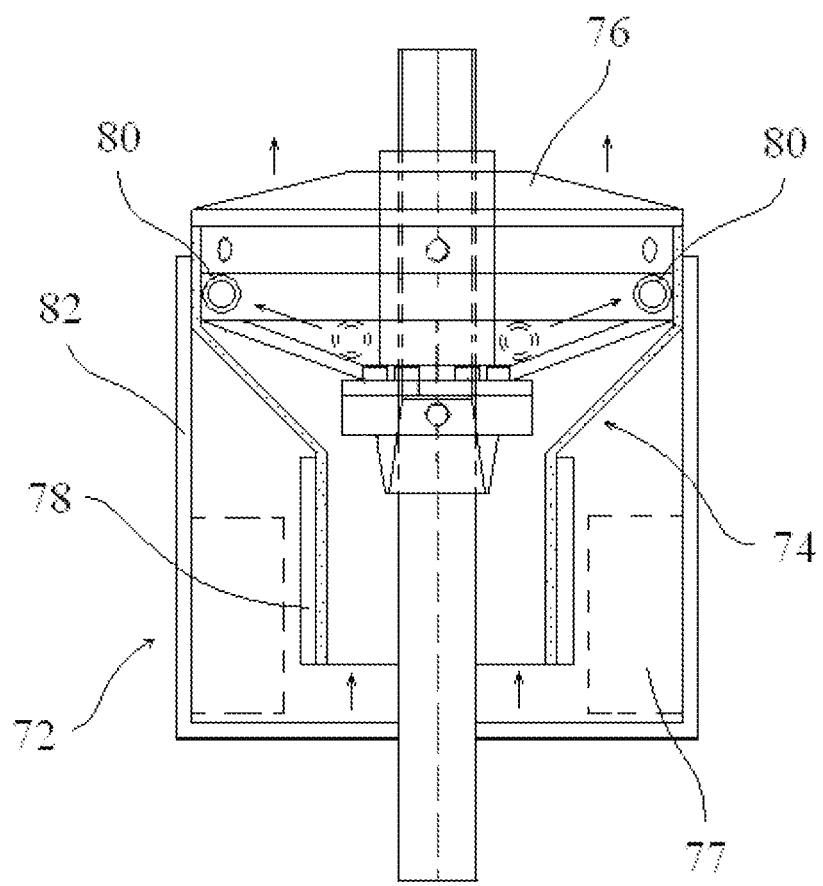
FIG. 5 is an operational view of another preferred embodiment of the present invention, showing the displacement of the pulley disk, and tossing-out of the pulley rollers.

In addition, referring to FIG. 4, showing the driving device 70 of another preferred embodiment of the present invention, the composition of the embodiment is roughly the same as the driving device 70, but differs in that: the motor 72 is in the style of a permanent-magnet brushless inner rotor motor, and the inner rotor 74 is connected to the pulley disk 76. In this way, when the motor 72 is operating, the inner rotor 74 can rotate under the excitation between the stator coil 77 and the permanent magnets 78, and the pulley disk 76 can also rotate simultaneously with the inner rotor 74. Therefore, the pulley rollers 80 will be tossed out by the centrifugal force generated by the revolving pulley disk 76. When the rotational speed of the inner rotor 74 is higher, the pulley disk 76 will cause a larger centrifugal force to toss out the pulley rollers 80, pushing the pulley disk 76 to move outward. Consequently, the inner rotor 74 will also be driven to move, as shown in FIG. 5, causing a change to the relative positions of the inner rotor 74 and such related components as the stator coil 77 (changing the overlapping area between the permanent magnets 78 and the stator coil 77 to obtain a weak magnetic effect), and changing the rotational speed of the inner rotor 74. Secondly, during operation of the motor 72, the stator coil 77 will heat up. As it is located outside the inner rotor 74, heat radiation is more convenient, and heat dissipation is more efficient.

Additionally, the driving device 70 can also be used as the wheel motor for motorcycles. In application, the inner rotor 74 is connected to one end of the pulley disk 76 connecting the wheel rim, while the casing 82 of the driving device 70 is fitted on the motorcycle body; in his way, when the inner rotor 74 rotates, it can directly drive the wheel of the motorcycle to run.

From the above, it is known that the driving device and the electric motorcycle driving system using the driving device provided by the present invention adopt a totally new structure with the motor and the pulley disk assembly, which considerably reduces the size and meanwhile enhances the flexibility of space utilization of the electric motorcycle.

Moreover, the new structure can change the overlapping area between the permanent magnets in the inner or outer rotor sleeve and the stator coil without using any electric control means. Therefore, it does not have extra consumption of electric power. Only by tossing out the pulley rollers through the mechanical centrifugal force, it can cause a displacement of the inner or outer rotor sleeve, and further change the rotational speed of the inner or outer rotor sleeve. With combination of the stepless speed change mechanism, it not only has the stepless speed change function, but also can generate different torque output based on different external loads. Therefore, the present invention has overcome the disability of existing electric motorcycles to enhance the speed and torque at the same time. If the existing battery performance is not considered, the motor can have limitless output power. Furthermore, it can directly output the rotational power of the inner rotor through such transmission components as belt or chain, and achieve a better heat dissipation effect.

What is claimed is:

1. A driving device, comprising:
   a motor, which comprises an outer rotor sleeve and such components as stator coil provided inside the outer rotor sleeve, wherein the inner wall of the outer rotor sleeve is provided with a plurality of permanent magnet;
   a pulley disk assembly, including a pulley disk, a substrate covering the pulley disk, a plurality of pulley rollers between the pulley disk and the substrate; the pulley disk is connected to one end of the outer rotor sleeve and is movable relative to the substrate; the substrate is located on the inner side of the outer rotor sleeve;
   a shaft, connected to the substrate and going through the outer rotor sleeve and the pulley disk; the outer rotor sleeve and the pulley disk can rotate and move relative to the shaft, and
   a contact plate, fixed on the shaft and located on the inner side of the outer rotor sleeve corresponding to the substrate,
   wherein the outer rotor sleeve comprises a cylinder with two open ends; the inner wall of the cylinder is configured with a first section and a second section with different inner diameters; the joining part between the first section and second section is formed as a stage; the inner diameter of the first section is larger than the second section; the first section is connected to the pulley disk, while the periphery of the contact plate is corresponding to the first section and is separated from the stage with some distance.

2. The device defined in claim 1, wherein the permanent magnets are fixed on the inner wall of the second section.

3. The device defined in claim 1, wherein the motor is a permanent-magnet brushless outer rotor motor.

4. The device defined in claim 1, wherein the pulley disk assembly is a pulley disk assembly with a stepless speed change system.

* * * * *